United States Patent
Maghsoodi (10) Patent No.: US 9,914,625 B2
(45) Date of Patent: Mar. 13, 2018

(54) WINCH OR HOIST SYSTEM WITH CLUTCH ADJUSTMENT

(71) Applicant: Goodrich Corporation, Charlotte, NC (US)

(72) Inventor: Bejan Maghsoodi, Diamond Bar, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 399 days.

(21) Appl. No.: 14/715,779

(22) Filed: May 19, 2015

(65) Prior Publication Data

US 2016/0340158 A1 Nov. 24, 2016

(51) Int. Cl.
| | |
|---|---|
| B66D 1/14 | (2006.01) |
| B66D 1/16 | (2006.01) |
| B66D 1/22 | (2006.01) |
| B66D 3/18 | (2006.01) |
| B66D 3/20 | (2006.01) |
| F16D 13/46 | (2006.01) |

(Continued)

(52) U.S. Cl.
CPC ............. *B66D 1/14* (2013.01); *B66D 1/16* (2013.01); *B66D 1/22* (2013.01); *B66D 3/18* (2013.01); *B66D 3/20* (2013.01); *F16D 13/46* (2013.01); *F16D 13/75* (2013.01); *F16D 25/14* (2013.01); *B66D 2700/0158* (2013.01)

(58) Field of Classification Search
CPC ... B66D 1/14; B66D 1/16; B66D 1/18; B66D 2700/0158; B66D 2700/58; F16D 13/46; F16D 13/48; F16D 13/752; F16D 25/14
See application file for complete search history.

(56) References Cited

U.S. PATENT DOCUMENTS

| | | | |
|---|---|---|---|
| 3,038,576 A | * | 6/1962 | Simpson ............ B66D 1/14 192/150 |
| 3,508,450 A | | 4/1970 | Richards |
| 3,511,349 A | | 5/1970 | Herscovici |

(Continued)

FOREIGN PATENT DOCUMENTS

| | | |
|---|---|---|
| CN | 204251253 U | 4/2015 |
| DE | 1138908 B | 10/1962 |

(Continued)

OTHER PUBLICATIONS

European Search Report for Application No. 16170385.5-1705, dated Oct. 14, 2016, 7 Pages.

*Primary Examiner* — Emmanuel M Marcelo
(74) *Attorney, Agent, or Firm* — Cantor Colburn LLP (57) ABSTRACT

A clutch comprises an input shaft, an output shaft, a biasing member and a plunger. The biasing member is arranged to provide a biasing force that allows torque transfer from the input shaft to the output shaft via one or more input friction plates and one or more output friction plates. Axial displacement of the plunger relative to the output shaft may cause the biasing force to vary to adjust the maximum torque setting of the clutch during reeling-in or reeling-out of a winch cable around a winch drum. A winch assembly may be provided that includes an arm in operable connection with a winch drum. The arm is displaced as the effective radius of the drum varies during reeling in or reeling out. Displacement of the arm can be communicated to the plunger to provide the axial displacement thereof.

16 Claims, 5 Drawing Sheets

(51) Int. Cl.
*F16D 13/75* (2006.01)
*F16D 48/02* (2006.01)

(56) References Cited

U.S. PATENT DOCUMENTS

| | | | |
|---|---|---|---|
| 3,697,049 A | 10/1972 | Wallace | |
| 3,771,627 A * | 11/1973 | Caldwell | B60T 1/062 188/170 |
| 3,801,071 A | 4/1974 | Barron | |
| 4,118,013 A | 10/1978 | Christison et al. | |
| 4,175,727 A | 11/1979 | Clarke | |
| 4,186,618 A * | 2/1980 | Richards | F16D 25/02 192/219 |
| 4,216,852 A * | 8/1980 | Ushijima | F16D 25/14 192/109 F |
| 4,325,470 A * | 4/1982 | Bopp | B66D 1/58 192/16 |
| 4,718,516 A * | 1/1988 | Ozaki | B60K 17/35 180/233 |
| 4,792,029 A * | 12/1988 | Andre | F16D 13/50 192/70.11 |
| RE33,303 E | 8/1990 | Denman et al. | |
| 5,482,148 A * | 1/1996 | Dadel | F16D 55/36 188/291 |
| 5,853,165 A * | 12/1998 | Kuivamaki | F16D 67/06 192/90 |
| 5,899,441 A * | 5/1999 | Kuivamaki | B66D 3/22 192/90 |
| 6,021,879 A * | 2/2000 | Pelouch | F16D 25/0638 192/106 F |
| 6,039,160 A * | 3/2000 | Joppeck | F16D 25/0638 192/52.5 |
| 6,202,814 B1 * | 3/2001 | Braford, Jr. | F16D 25/0638 188/264 E |
| 6,213,907 B1 * | 4/2001 | Wooden | F16H 37/086 475/216 |
| 7,891,641 B1 * | 2/2011 | Miller | B66D 1/16 254/344 |
| 2002/0166748 A1 * | 11/2002 | Keener | F16D 25/0638 192/70.12 |
| 2006/0032722 A1 * | 2/2006 | Guinter | F16D 25/0638 192/85.33 |
| 2006/0169560 A1 * | 8/2006 | Knowles | F16D 23/04 192/53.1 |
| 2016/0025156 A1 * | 1/2016 | Pritchard | F16D 13/69 192/70.23 |

FOREIGN PATENT DOCUMENTS

| | | |
|---|---|---|
| EP | 0629760 A2 | 12/1994 |
| EP | 0967173 A2 | 12/1999 |
| SU | 998319 A1 | 2/1983 |
| WO | 2013181751 A1 | 12/2013 |

* cited by examiner

WINCH OR HOIST SYSTEM WITH CLUTCH ADJUSTMENT

TECHNICAL FIELD

The present disclosure relates to a clutch for driving a winch or hoist, a winch/hoist system and a method of adjusting a clutch torque setting.

BACKGROUND

When using a winch (or hoist) to raise a payload, a winch cable is attached to a motor-driven drum at one end and the payload at the other. The motor is driven to rotate the drum in order to gather up the winch cable on the outer circumference of the drum. As the cable is laid onto the drum, the drum radius is effectively increased, due to the extra radius provided by the build-up of layers of cable laid thereon. The increasing radius increases the torque necessary to lift the payload, due to moment effects. In a modern hoist or winch system, a clutch is provided to limit the torque applied to the drum. Unfortunately, in the event of the aforementioned effective drum radius increase, the extra torque required must be somehow accommodated by the clutch, which traditionally only has a fixed setting (i.e. a maximum torque before it slips), set by the friction between the clutch plates. As the cable is reeled-in with a fixed line load, the torque generated may be too great, causing the clutch to slip. This could lead to the drum free-wheeling and the dropping of the payload.

SUMMARY

It is the aim of the present disclosure to overcome the aforementioned disadvantages by providing a clutch for a winch that allows the clutch setting to be varied as the winch cable winds up or down (is reeled-in or out), to account for the torque variation due to the variation in effective drum radius. An auxiliary system to moderate for torque variation due to friction-based variations may also be used in the clutch.

It will be appreciated by one skilled in the art that "winch" or "hoist" refer to the same apparatus, and for the purposes of this disclosure, the terms may be used interchangeably. Only a winch shall be referred to in the description, however, in accordance with the above, any reference to a winch could equally refer to a hoist.

From a first aspect, the present disclosure provides a clutch for driving a winch. The clutch comprises an input shaft, an output shaft, a biasing member and a plunger. The input shaft is configured for connection to a drive means and is operatively connected to at least one input friction plate for rotation therewith. The output shaft is configured for driving a winch and is operatively connected to at least one output friction plate for rotation therewith. The biasing is arranged to provide a biasing force that pushes the at least one input friction plate and the at least one output friction plate into contact with each other so that torque can be transferred from the input shaft to the output shaft via the input and output friction plates. The plunger is disposed coaxially with and axially moveable relative to the output shaft, and axial displacement of the plunger relative to the output shaft causes the biasing force to vary.

The plunger may be configured for operative connection to a winch drum or a cable attached thereto, such that a change in effective drum radius causes said axial displacement.

It is to be understood that for the purposes of this disclosure "effective drum radius" is defined as the radius of a winch drum combined with the width of the winch cable layers wound thereon. A winch cable layer is formed when the entire circumferential width of the drum has been covered with winds of cable and the cable must be laid over the top of the existing cable in order to be reeled on to the drum.

It is to be understood that for the purposes of this disclosure, any "connections" between first and second parts may be direct or indirect, unless otherwise specified. An indirect connection between first and second parts may comprise one or more intervening members.

Reference to displacement "axially" relative to a rotatable shaft should be understood to refer to movement along a direction substantially parallel or aligned with the rotational axis of that shaft.

The varying biasing force provided by the above aspect means that the frictional engagement of the input and output friction plates varies and, as such, the torque setting at which the plates slip relative to each other also varies. In use, the clutch may be configured so that rotating a connected drum to reel-out a winch cable (lower a load) causes the biasing force to decrease via axial displacement of the plunger. The result of this is that the maximum torque that can be transmitted by the clutch (before the friction plates slip) is decreased as the effective radius of the drum decreases. This ensures the clutch will slip before a harmful load is allowed to pass through the clutch and possibly be transmitted to the structure to which the winch is attached. In addition, the plunger displacement can be used to increase the biasing force when the drum reels-in the winch cable (raising a load). This ensures that the clutch torque setting remains appropriately high for the given load and effective drum radius, such that the clutch does not slip prematurely.

In accordance with an embodiment of the above aspect, the biasing member may comprise one or more disc springs positioned around the output shaft. For example, there may be three or more disc springs.

In accordance with an embodiment of the above aspect, the axial translation of the plunger may cause the compression of the biasing member or disc springs to be varied. Compressing the spring(s) may decrease the biasing force provided.

Alternatively, other biasing members could be used such as an elastomeric block or a hydraulic arrangement.

In accordance with an embodiment of the above aspect, the plunger is disposed inside a plunger housing that is coaxial with and fixed axially relative to the output shaft.

In accordance with an embodiment of the above aspect, axial displacement of the plunger is communicated to the biasing member to vary the biasing force.

In one embodiment, the axial displacement is communicated mechanically to the biasing member. For instance, in one particular embodiment, the plunger may further comprise projections extending radially therefrom, said projections extending through apertures in the output shaft to allow mechanical communication with the biasing member. For example, the projections may press directly or indirectly against and compress the biasing member.

Alternatively, in another embodiment, the axial displacement of the plunger may be communicated to the biasing member hydraulically.

In such an embodiment, the output shaft may further comprise an output shaft flange forming at least one chamber and first channels disposed through the output shaft. The first channels allow fluid communication between the first chamber and an interior of the plunger housing. The clutch further comprises a piston, which is disposed at least partially in the first chamber forming a fluid-tight seal therewith, axially moveable in the first chamber relative to the output shaft, and is in mechanical communication with the biasing member. The plunger housing further comprises second channels disposed therethrough, allowing fluid communication with the first channels in the output shaft.

In an embodiment, a second chamber is formed within the plunger housing and the first chamber and second chambers comprise hydraulic fluid.

In an embodiment, the channels through the plunger housing and the output shaft allow communication of hydraulic fluid between the first and second chambers.

In yet a further embodiment, the hydraulic fluid is communicated between the chambers due to the axial displacement of the plunger within the second chamber.

From a second aspect, the present disclosure provides a winch assembly. The winch assembly comprises a clutch in accordance with the above aspect or any embodiments thereof, a motor, a drum, a cable and an arm. The motor is operatively connected to the input shaft. The drum is operatively connected to the output shaft for rotation about a drum axis. The cable is attached to the drum and windable therearound to create a varying effective drum radius. The arm has a first end operatively connected to the drum, such that its radial position, relative to the drum axis, changes as the effective drum radius varies, and a second end operatively connected to the plunger of the clutch.

In accordance with an embodiment of the second aspect, the radial displacement of the first end of the arm is communicated to the plunger to provide axial displacement thereof. In a further embodiment, the communication is provided by at least one of a mechanical connection and a hydraulic connection.

It is to be understood that for the purposes of this disclosure "radial displacement of the first end of the arm" refers to the movement or translation of the first arm relative to the radial axis of the drum.

In accordance with an embodiment of the second aspect, the arm is pivotally attached at a point between the first and second ends of the arm to a static structure, and the winch assembly further comprises a roller operatively connected to the first end of the arm for rotation thereabouts and at least one of a mechanical or hydraulic connection at the second end of the arm. The roller is arranged to rest on an outer surface of an outermost layer of cable on the drum and the connection communicates displacement of the second end of the arm to the plunger to provide axial displacement thereof.

From a third aspect, the present disclosure provides a method of adjusting a clutch torque setting for a clutch in accordance with the first aspect, when the clutch is in use in a winch assembly. The method comprising the steps of reeling in or reeling out a cable attached to a winch drum, communicating variation in an effective drum radius caused by the reeling in or reeling out of the cable to generate the axial displacement of the plunger, and communicating the axial displacement of the plunger to the biasing member to vary the biasing force.

In accordance with an embodiment of the third aspect, the step of communicating variation in an effective drum radius comprises, detecting said variation via radial displacement of a pivoted arm in operative communication with an outer surface of an outermost layer of a cable laid on the drum.

In accordance with an embodiment of the third aspect, the step of communicating variation in an effective drum radius to the plunger further comprises providing at least one of a mechanical or hydraulic connection from the arm to the plunger. The connection translates the radial displacement of the arm to axial displacement of the plunger.

BRIEF DESCRIPTION OF THE DRAWINGS

Exemplary embodiments and features of the present disclosure will now be described by way of example only, and with reference to FIGS. 1 to 4b, of which.

DETAILED DESCRIPTION

Figure 1:
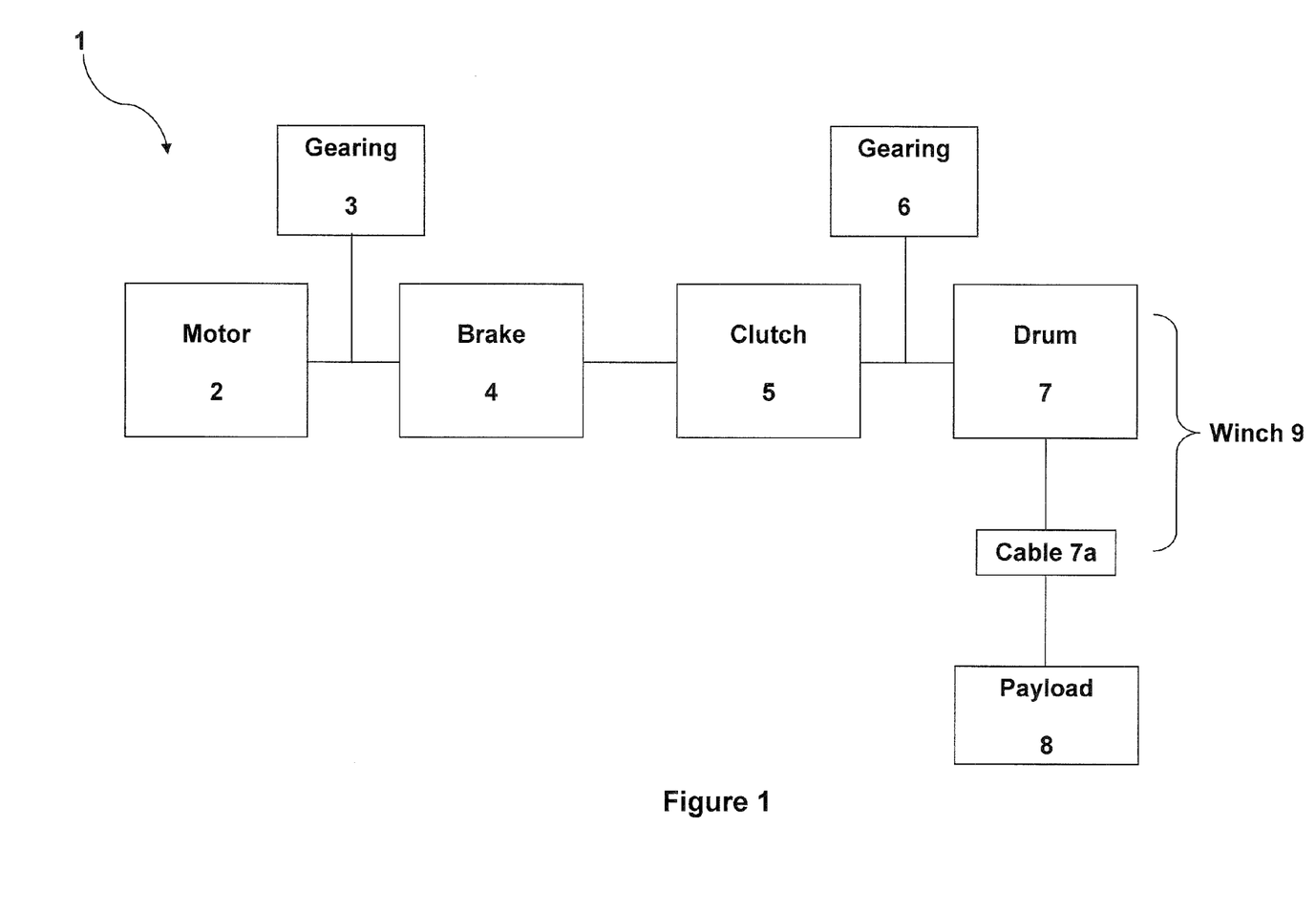
FIG. 1 is an overview of a winch system, in accordance with aspects of the present disclosure.

FIG. 1 shows an overview of a typical winch system 1, as is known in the art. A driving means, such as a motor 2, is operatively connected to a brake 4 through gearing 3, which is operatively connected to a clutch 5, which is operatively connected to a drum 7 through gearing 6. The motor 2 is activated to provide drive to the drum 7 through the gearing 3, brake 4, clutch 5 and gearing 6, in order to reel in (or out) a winch cable 7a to lift (or drop) a payload 8. The drum 7 and cable 7a together form a winch 9. The brake 4 is provided as a means to stop cable winding without disengaging motor 1, whereas clutch 5 acts as a moderating means for the drive, allowing the drum 7 to be disconnected from the motor 2 should the drum 7 become overloaded.

Figure 2:
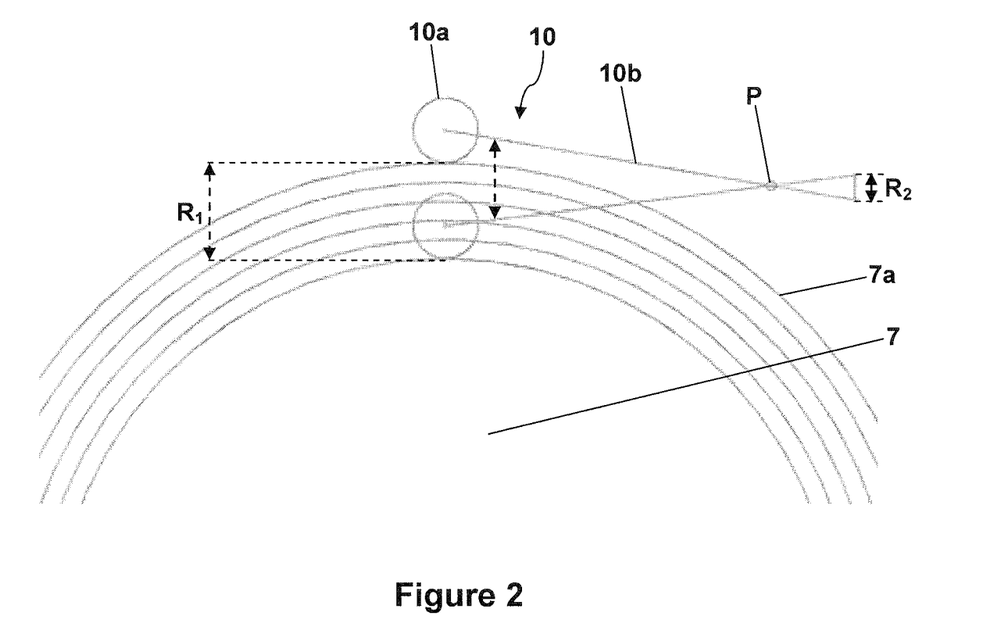
FIG. 2 is an illustration of a cable arm follower's radial movement between a maximum and minimum effective drum radius on a drum of a winch system, in accordance with aspects of the present disclosure.

FIG. 2 shows the action of a cable arm follower 10 when the cable 7a is reeled in or out around the drum 7, in accordance with aspects of the present disclosure. The cable arm follower 10 comprises a roller head 10a and an arm 10b. Roller head 10a is free to rotate and is connected to the arm 10b via an axle therethrough, or any other suitable method, as would be apparent to one skilled in the art. Arm 10b includes a pivot point P at a distal end thereof. Pivot point P may be secured to an internal or external part of the winch assembly (not shown), as is convenient. Roller head 10a sits on a portion of the outer surface of the cable 7a and may comprise a circumferential groove therein to aid seating of the roller head 10a on the cable 7a. As cable 7a is reeled out off the drum 7 the roller head 10a will rotate and allow cable 7a to be fed out past it. Although FIG. 2 illustrates a cable arm follower positioned above a winch drum, it should be understood than any positioning of follower could be used, as is convenient. For instance, the cable arm follower could be positioned at one side of the drum or underneath it. It is also to be understood, that within the scope of this disclosure, the cable arm follower may also be biased against the outer surface of cable 7a, for instance, by a spring bias. Such bias may act to allow the roller head 10a to remain in reliable contact with the outer surface of cable 7a. This may be advantageous in conditions where the winch assembly may be susceptible to vibrations and/or jolts, for instance on a helicopter.

As shown in FIG. 2, the cable 7a may form stacks of multiple winds (or layers) around the drum 7, in this case five layers are illustrated. In many applications, such cable wind stacking is necessary to provide a sufficiently long cable whilst keeping the drum 7 and winch assembly advantageously compact. As a complete wind stack is added or removed from drum 7 during reeling in or reeling out of cable 7a the "effective radius" of drum 7 increases or decreases accordingly, by the diameter of the cable, where the "effective radius"=the radius of the drum+the radial height added by the stacks of cable winds. The seating of the roller head 10a on cable 7a allows the cable arm follower 10 to follow the variation in effective drum radius caused by the reeling in or out of cable 7a.

As shown in FIG. 2, when the cable 7a is fully wound up (reeled in) cable arm follower will be at a first radial height. As cable 7a is reeled out off drum 7 and the number of wind stacks decreases so does the effective drum radius. As a result the radial height of cable arm follower 10 will correspondingly decrease.

The maximum radial displacement of cable arm follower 10 (from cable fully reeled in to fully reeled out) is represented by R1. Pivot point P can be used to translate the radial displacement R1 to a distal end of the cable arm follower 10, represented by radial displacement R2. Radial displacement of the distal end of the cable arm follower over the range of displacement R2 can be communicated to a winch assembly clutch.

For instance, in one embodiment, the distal end of the cable arm follower 10 can be operatively connected to a clutch of a winch assembly using a mechanical connection, such as a rigid cable.

In another embodiment, the distal end of the cable arm follower 10 can be operatively connected to a clutch of a winch assembly using a hydraulic connection, for instance using a hydraulic line. The hydraulic line may hold hydraulic fluid therein. Radial displacement of the cable arm 10b can be transferred as movement of the hydraulic fluid by connecting a piston to the distal end of the cable arm follower, as will be understood by one skilled in the art.

It will be appreciated by one skilled in the art that both mechanical and hydraulic connections each present certain advantages. For instance, a mechanical connection may be less expensive, lighter weight and/or easier to maintain than a hydraulic one. However, a hydraulic connection may enable more force to be transmitted from the radial displacement of cable arm follower 10 than the mechanical connection.

The basic function of various embodiments of clutches for winch assemblies, in accordance with this disclosure, will now be described.

Figure 3:
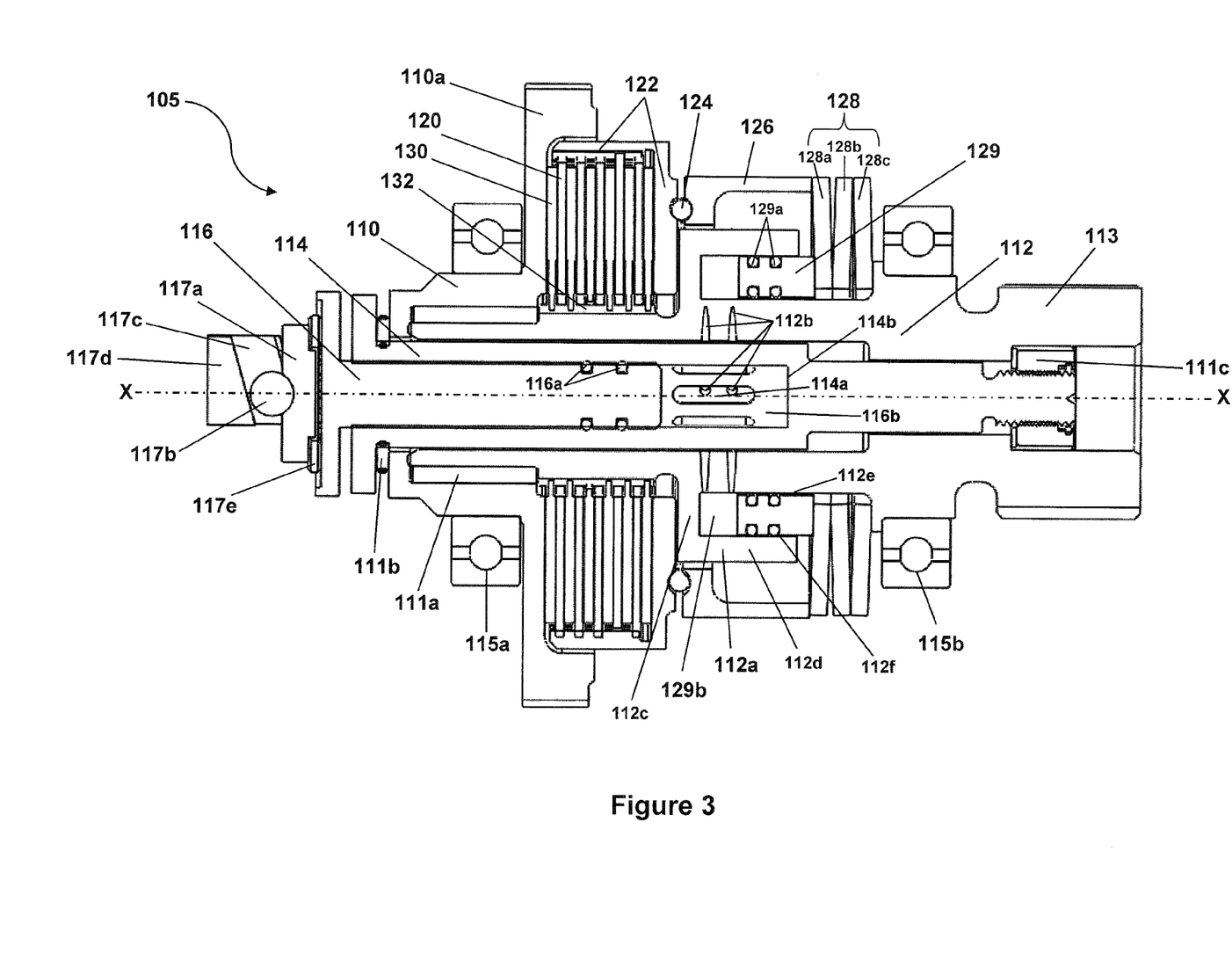
FIG. 3 is a cross-section of a clutch, in accordance with one embodiment of the present disclosure, when the drum is at a maximum effective radius.
Figure 4A:
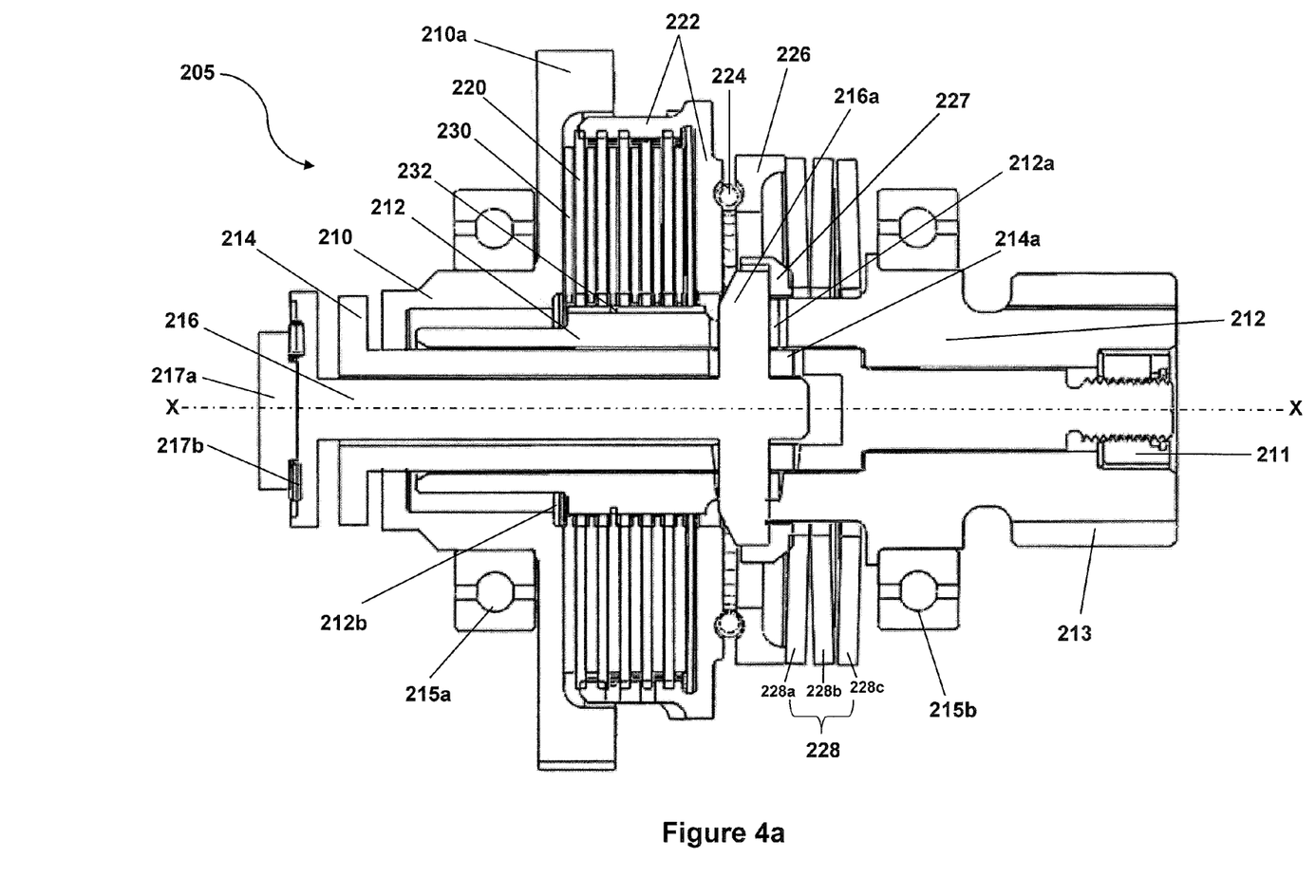
FIG. 4a is a cross-section of a clutch, in accordance with another embodiment of the present disclosure, when the drum is at a maximum effective radius.

FIGS. 3 and 4a each show a cross-section of an exemplary embodiment of a clutch 105, 205 for a winch assembly in accordance with this disclosure. Clutches 105, 205 are shown at the condition when the drum 7 is at maximum effective radius (i.e. there is all of cable 7a is wrapped around the drum 7). As shown, clutches 105, 205 comprise an input shaft 110, 210 which in use would be connected to the motor 2 (not shown) via input gear 110a, 210a and is rotatable about axis X. Clutches 105, 205 also comprise an output shaft 112, 212 arranged co-axially with the input shaft 110, 210 and rotatable about axis X. Output shaft 112, 212 further comprises an output gear 113, 213 at an output end thereof, in order to facilitate transfer of drive to the winch drum 7 (not shown).

Bearing 115a, 215a supports the input shaft 110, 210 and bearing 115b, 215b supports the output shaft 112, 212. Bearings 115a, 115b, 215a, 215b may be attached to a support structure (not shown) to hold the clutches 105, 205 in place on the apparatus on which they may be installed. Clutches 105, 205 may be installed on a vehicle, for example an aircraft, such as a helicopter, or may be installed on a something other than a vehicle, for example a crane (whether stationary or mobile) or on a building.

Input friction plates 120, 220 are operatively connected to the input shaft 110, 210 via an input flange 122, 222 and intervening output friction plates 130, 230 are attached to an output flange 132, 232 which is attached to output shaft 112, 212 for rotating therewith. While these embodiments use six output friction plates and five input friction plates, any number of each plate could be used.

Clutches 105, 205 further comprise a spring pack 128, 228 comprising three disc springs 128a, 128b, 128c, 228a, 228b, 228c also known as Belleville springs or washers. In these particular embodiments, the disc springs are co-axial with the output shaft 112, 212 and centred around the output shaft 112, 212. The spring pack 128, 228 is connected to the output shaft 112, 212 such that the spring pack 128, 228 rotates with the output shaft 112, 212 (about axis X). The spring pack 128, 228 is in mechanical communication with a connecting arm 126, 226 via a plurality of ball bearings 124, 224 so that it can rotate relative to the input flange 122, 222. Bearings 124, 224 are located in opposing recesses in flange 122, 222 and the connecting arm 126, 226.

As will be understood by one skilled in the art, clutches 105, 205 allow rotation of the input shaft 110, 210 to be transferred to the output shaft 112, 212 via spring loaded engagement of the input friction plates 120, 220 with the output friction plates 130, 230. The maximum permitted amount of torque transferred from the input shaft 110, 210 to the output shaft 112, 212 and vice versa, can be controlled by adjusting the degree of spring loading. This changes the degree of frictional engagement between output friction plates 130, 230 and input friction plates 130, 230.

It is known that during operation of a clutch, such as the illustrated clutches 105, 205 the friction properties of friction plates 120, 130, 220, 230 can vary greatly during use and over the operational life of the clutch 105, 205. This friction property variation can cause unacceptable variations in the maximum permitted torque transfer between input shaft 110, 210 and output shaft 112, 212 and may lead to the clutch slipping too easily or not easily enough.

Within the scope of this disclosure, a ball-ramp assembly may be used to moderate and minimise the torque setting variation encountered when operating the clutch, by adjusting the force with which the input plates 120, 220 are pressed upon output plates 130, 230. Such a ball-ramp assembly is disclosed in U.S. Pat. No. 3,511,349, and involves placing an intervening member between input flange 122, 222 and ball bearing 124, 224. The intervening member includes a recess which holds a ball. When a friction variation at the plates causes an instantaneous change in torque transfer through the clutch, the recess acts as a cam member that cams the ball to increase or decrease the separation between the input flange and the intervening member. This change in separation will either oppose or add to the biasing force on the friction plates 120, 130, 220, 230 to compensate for the change in friction property. The action of the ball-ramp assembly prevents/minimises any variation in torque setting caused thereby. This provides an advantage over clutches not having a ball-ramp assembly. However, the present disclosure extends to clutches not having a ball-ramp assembly.

It is also to be understood that within the scope of this disclosure, the clutch used may be of either a dry-type or a wet-type clutch. A wet-type clutch features a fluid (e.g. oil) at least in the region surrounding the friction plates, whereas a dry-type clutch does not. As will be appreciated by one skilled in the art, wet-type clutches have advantages such as better lubrication and/or heat management than dry-type clutches. Dry-type clutches, however, may be less expensive and simpler to maintain, although may need maintenance more often.

Various methods for adjusting a clutch setting utilising the cable arm follower displacement will now be described.

As described above, when a winch drum has a higher effective radius, moment effects mean a higher torque is imparted to the clutch 105, 205 per unit load than when the effective drum radius is lower. It is important that an increase in torque caused by the higher effective drum radius does not cause the clutch 105, 205 to slip prematurely when raising a safe load. It is also equally important that an unsafe load is not allowed to be transferred through the clutch without it slipping, due to the moment effect of lowering effective drum radius.

In accordance with the present disclosure, this is ensured by providing an appropriate maximum biasing force from spring pack 128, 228 when the effective drum radius is at a maximum and gradually reducing the biasing force as effective drum radius decreases. In various embodiments, this reduction in biasing force can be driven by the radial displacement of cable arm follower 10, as will become clear from the description below.

FIG. 3 illustrates one exemplary embodiment of a clutch for a winch assembly that demonstrates one method of adjusting a clutch setting utilising the cable arm follower displacement, in accordance with some aspects of this disclosure.

As shown, clutch 105 further comprises a plunger 116 and plunger housing 114, both being concentric with the output shaft 112 and rotatable therewith. Plunger housing 114 is secured to the output shaft 112 using a nut 111c at a distal end thereof and is supported against the input shaft 110 by a roller bearing 111b, which allows relative rotation thereto. Plunger 116 fits within plunger housing 114 and is axially moveable relative to the housing 114. Plunger 116 further comprises seals 116a disposed circumferentially therearound to provide a fluid-tight seal between an outer surface of the plunger and an inner surface of the housing 114. A volume 116b is defined between the end of the plunger 116 and the inner end surface 114b of the housing 114, which contains hydraulic fluid (e.g. oil). Housing 114 further comprises delivery channels 114a therein, which allows communication of the hydraulic fluid through the output shaft 112 via channels 112b therein. As shown, in this particular embodiment, output shaft 112 further comprises a flange 112a which has a radially outwardly projecting portion 112c and an axially extending portion 112d. A piston 129 is disposed radially within the flange portion 112d and is axially moveable. Piston 129 includes seals 129a disposed circumferentially therearound to provide a fluid-tight seal between surface 112e of the output shaft 112 and inner surface 112f of the output flange portion 112d, and together with the output shaft 112 defines a volume 129b. Volume 129b also contains hydraulic fluid (e.g. oil) and is in fluid communication with volume 116b via channels 114a and 112b. Piston 129 is in mechanical communication with spring pack 128 and can be axially displaced to oppose the biasing force thereof using the hydraulic fluid, as will be explained below.

As will be appreciated by one skilled in the art, axial displacement of plunger 116 within housing 114 will change the size of volume 116b and move hydraulic fluid between volume 116b and volume 129b via channels 114a and 112b correspondingly. When the plunger 116 is minimally inserted into the housing 114 (i.e. positioned towards the left hand side of FIG. 3) volume 116b is as large as possible. This will make volume 129b as small as possible, as the majority of the hydraulic fluid will be communicated to volume 116b to achieve pressure equilibrium. Subsequent axial displacement of plunger 116 into the housing (i.e. towards the right hand side of FIG. 3) will reduce volume 116b. This will force more hydraulic fluid to be communicated to volume 129b via channels 114a, 112b. The fluid will push against piston 129 and cause axial displacement thereof, to achieve pressure equilibrium once more. As shown in FIG. 3, and mentioned above, axial displacement of piston 129, towards the spring pack 128, will compress the spring pack 128 and reduce the biasing force exerted thereby. Following the same principle, when the axial displacement of plunger 116 is reduced so is the axial displacement of piston 129, and so the biasing force exerted by the spring pack 128 is increased accordingly.

Plunger 116 further comprises an input plate 117a. Input plate 117a is operatively connected to plunger 116 to enable axial displacement thereof via a roller bearing 117e. Roller bearing 117e allows rotation of plunger 116 relative to input plate 117a. Input plate 117a can be operatively connected to the distal end of cable arm follower 10 to allow communication of effective drum radius variations to the plunger 116 and cause axial movement thereof to vary spring bias accordingly.

In the illustrated embodiment, input plate 117a further comprises a slider block assembly to aid translation of cable arm follower radial displacement to axial translation of plunger 116. A ball bearing 117b is secured to input plate 117a and free to rotate relative thereto. A slider block 117d is operatively connected around ball bearing 117b via a guide channel 117c therein, and is slideable relative to input plate 117a. Guide channel 117c is angled such that it acts as a camming surface for ball bearing 117b. As will be appreciated by one skilled in the art, when slider block 117d is "pulled/pushed" by displacement of cable arm follower 10 it will cause ball bearing 117b to slide along guide channel 117c and pull/push on plunger 116 in an axial direction. This allows translation of displacement in the radial direction to displacement in the axial direction. As will be understood by one skilled in the art, this may aid freedom of design for providing a suitable connection between cable arm follower 10 and plunger 116.

It is to be understood, however, that the slide block assembly is only an exemplary input, and any other suitable connection to allow translation of cable arm follower 10 displacement to plunger 116 may be used in relation to this embodiment. For instance, cable arm displacement may displace plunger 116 in an axial direction without the need for a slider block assembly. This may be achieved by configuring cable arm follower 10 to be displaced in a direction parallel to the axial direction of clutch 105 and connecting it directly or indirectly to a proximal end of plunger 116 or input plate 117a.

Figure 4B:
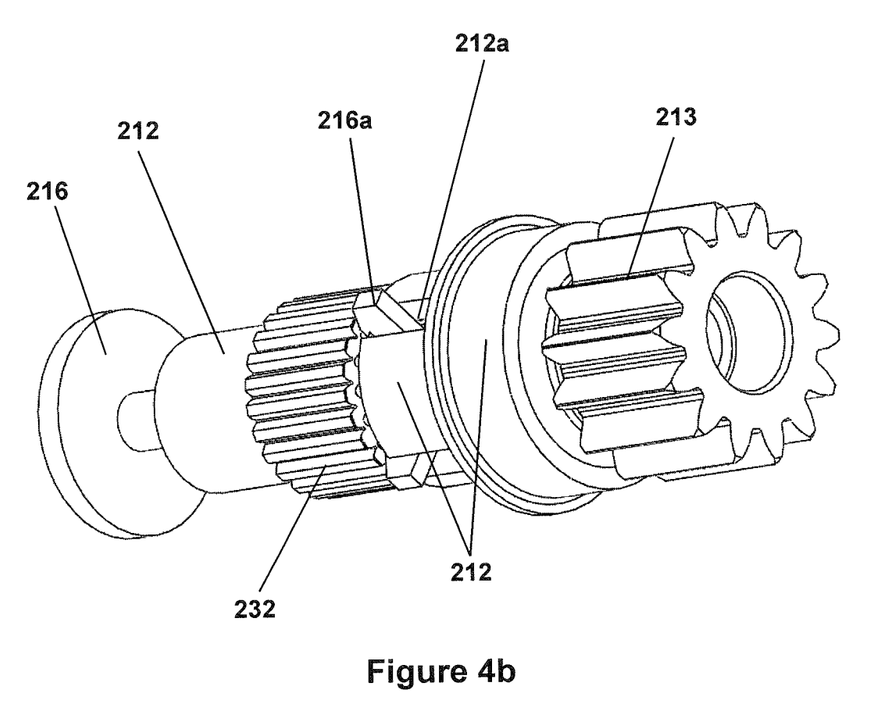
FIG. 4b is an external perspective view of the clutch of FIG. 4a with certain features removed for clarity of illustration.

FIGS. 4a and 4b illustrate another exemplary embodiment of a clutch for a winch assembly that demonstrates another method of adjusting a clutch setting utilising the cable arm follower displacement in accordance with some aspects of this disclosure.

As shown, clutch 205 further comprises a plunger 216 and plunger housing 214, both being concentric with the output shaft 212 and rotatable therewith. Plunger housing 214 is secured to the output shaft 212 using a nut 211 at a distal end thereof. Plunger 116 fits within plunger housing 114 and is axially moveable relative to the housing 214. Plunger 216 further comprises one or more projections 216a extending radially outward therefrom. Projections 216a project through apertures 214a in housing 214 and apertures 212a in output shaft 212 and are in operable mechanical contact with spring pack 228 via flange 227.

In the specific illustrated embodiment shown in FIGS. 4a and 4b, plunger 216 includes four projections 216a equally spaced around the circumference of the plunger 216. It is to be understood, however, that any number of projections and any degree of spacing between them, equal or not, could be used within the scope of this disclosure.

As will be appreciated by one skilled in the art, axial displacement of plunger 216 within housing 214 will cause axial displacement of projections 216a, which will cause flange 227 to push against spring pack 228 and reduce the biasing force exerted thereby. When the plunger 216 is minimally inserted into the housing 214, flange 227 will not interact with the spring pack 228, allowing maximum bias force to be exerted on the friction plates 220, 230 of the clutch 205. Subsequent axial displacement of plunger 216 into the housing will progressively push flange 227 to progressively oppose and reduce the biasing force of spring pack 228, until it is at a given minimum, dictated by the maximum allowed axial displacement of plunger 216 within housing 214.

FIG. 4b shows a perspective external view of clutch 205 with the input shaft 210, associated flange 222, input/output friction plates 220, 230, bearings 215a, 215b, spring pack 228, plunger housing 214, and associated connecting members/flange 224, 226, 227 omitted. This view illustrates more clearly the protrusion of projections 216a through the output shaft 212 for contact with spring pack 228.

As shown in FIG. 4a, plunger 216 further comprises an input plate 217a. Input plate 217a is operatively connected to plunger 216 to enable axial displacement thereof via a roller bearing 217b. Roller bearing 217b allows rotation of plunger 216 relative to input plate 217a. As with the embodiments described in relation to FIG. 3, input plate 217a can be operatively connected to the distal end of cable arm follower 10 to allow communication of effective drum radius variations to the plunger 216 and cause axial movement thereof to vary spring bias accordingly. In this embodiment, input plate 217a does not comprise a slider block assembly, and instead cable arm follower 10 is connected directly or indirectly thereto, such that displacement thereof can be translated as axial displacement of plunger 216. As described above, this may be provided by configuring the displacement of cable arm follower 10 to be in a direction parallel to the axial direction of clutch 205 and providing at least one of a mechanical or hydraulic connection therefrom to the plunger 216.

It is to be understood, however, that this is only an exemplary input method, and any other suitable connection to allow translation of cable arm follower 10 displacement to plunger 216 may be used in relation to this embodiment. For instance, this embodiment may include a slider block assembly such as in the embodiment described in relation to FIG. 3. As will be appreciated by one skilled in the art, the input method/connection can be chosen based on winch assembly design considerations.

As will be appreciated by one skilled in the art, FIG. 3 relates to a hydraulic method of varying bias force using plunger 116, whereas FIGS. 4a and 4b relate to a mechanical method of varying bias force using plunger 216. Each method may have advantages over the other. For instance, the hydraulic method may allow more force to be communicated to the spring pack with smaller axial displacements of the plunger, whereas the mechanical method may be less costly to produce and simpler to maintain.

Although the figures and the accompanying description describe particular embodiments, it is to be understood that the scope of this disclosure is not to be limited to such specific embodiments, and is, instead, to be determined by the following claims.

The invention claimed is:

1. A clutch for driving a winch, the clutch comprising:
an input shaft for connection to a drive means and being operatively connected to at least one input friction plate for rotation therewith;
an output shaft for driving the winch and being operatively connected to at least one output friction plate for rotation therewith;
a biasing member arranged to provide a biasing force that pushes the at least one input friction plate and the at least one output friction plate into contact with each other so that torque can be transferred from the input shaft to the output shaft via the input and output friction plates; and
a plunger disposed co-axially with and axially moveable relative to the output shaft, wherein axial displacement of the plunger relative to the output shaft causes the biasing force to vary;
wherein the biasing member is at least one disc springs positioned around the output shaft.

2. The clutch of claim 1, wherein the plunger is disposed inside a plunger housing that is co-axial with and fixed axially relative to the output shaft.

3. The clutch of claim 2, wherein axial displacement of the plunger is communicated to the biasing member hydraulically.

4. The clutch of claim 1, wherein axial displacement of the plunger is communicated to the biasing member mechanically.

5. A clutch for driving a winch, the clutch comprising:
an input shaft for connection to a drive means and being operatively connected to at least one input friction plate for rotation therewith;
an output shaft for driving the winch and being operatively connected to at least one output friction plate for rotation therewith;
a biasing member arranged to provide a biasing force that pushes the at least one input friction plate and the at least one output friction plate into contact with each other so that torque can be transferred from the input shaft to the output shaft via the input and output friction plates; and
a plunger disposed co-axially with and axially moveable relative to the output shaft, wherein axial displacement of the plunger relative to the output shaft causes the biasing force to vary;
wherein axial displacement of the plunger is communicated to the biasing member mechanically;
wherein the plunger further comprises projections extending radially therefrom, said projections extending through apertures in the output shaft to allow mechanical communication with the biasing member.

6. A clutch for driving a winch, the clutch comprising:
an input shaft for connection to a drive means and being operatively connected to at least one input friction plate for rotation therewith;
an output shaft for driving the winch and being operatively connected to at least one output friction plate for rotation therewith;
a biasing member arranged to provide a biasing force that pushes the at least one input friction plate and the at least one output friction plate into contact with each other so that torque can be transferred from the input shaft to the output shaft via the input and output friction plates; and
a plunger disposed co-axially with and axially moveable relative to the output shaft, wherein axial displacement of the plunger relative to the output shaft causes the biasing force to vary;
wherein the plunger is disposed inside a plunger housing that is co-axial with and fixed axially relative to the output shaft;
wherein axial displacement of the plunger is communicated to the biasing member hydraulically;
wherein the output shaft further comprises:
an output shaft flange forming at least a first chamber for receiving hydraulic fluid; and
first channels disposed through the output shaft, allowing fluid communication between the first chamber and an interior of the plunger housing; and wherein:
the clutch further comprises a piston being disposed at least partially in the first chamber forming a fluid-tight seal therewith, the piston being axially moveable in the first chamber relative to the output shaft and in mechanical communication with the biasing member; and wherein
the plunger housing further comprises second channels disposed therethrough, allowing fluid communication with the first channels in the output shaft.

7. The clutch of claim 6, wherein a second chamber for receiving hydraulic fluid is formed within the plunger housing.

8. The clutch of claim 7, wherein the first and second channels allow communication of hydraulic fluid between the first and second chambers.

9. The clutch of claim 8, wherein hydraulic fluid is communicated between the chambers due to axial displacement of the plunger within the second chamber.

10. A winch assembly, comprising:
a clutch, the clutch including:
an input shaft for connection to a drive means and being operatively connected to at least one input friction plate for rotation therewith;
an output shaft for driving the winch and being operatively connected to at least one output friction plate for rotation therewith;
a biasing member arranged to provide a biasing force that pushes the at least one input friction plate and the at least one output friction plate into contact with each other so that torque can be transferred from the input shaft to the output shaft via the input and output friction plates; and
a plunger disposed co-axially with and axially moveable relative to the output shaft, wherein axial displacement of the plunger relative to the output shaft causes the biasing force to vary;
a motor operatively connected to the input shaft;
a drum operatively connected to the output shaft for rotation about a drum axis;
a cable attached to the drum and windable therearound to create a varying effective drum radius; and
an arm having a first end operatively connected to the drum, such that its radial position, relative to the drum axis, changes as the effective drum radius varies, and a second end operatively connected to the plunger.

11. The winch assembly of claim 10, wherein the radial displacement of the first end of the arm is communicated to the plunger to provide axial displacement thereof.

12. The winch assembly of claim 11, wherein the communication is provided by at least one of a mechanical connection and a hydraulic connection.

13. The winch assembly of claim 10, wherein the arm is pivotally attached at a point between the first and second ends of the arm to a static structure, and the winch assembly further comprises:
a roller operatively connected to the first end of the arm for rotation thereabouts, wherein the roller is arranged to rest on an outer surface of an outermost layer of cable on the drum; and
at least one of a mechanical or hydraulic connection is provided at the second end of the arm, to communicate displacement of the second end of the arm to the plunger to provide axial displacement thereof.

14. A method of adjusting a clutch torque setting for a clutch of claim 1 when in use in a winch assembly, the clutch including: an input shaft for connection to a drive means and being operatively connected to at least one input friction plate for rotation therewith; an output shaft for driving the winch and being operatively connected to at least one output friction plate for rotation therewith, a biasing member arranged to provide a biasing force that pushes the at least one input friction plate and the at least one output friction plate into contact with each other so that torque can be transferred from the input shaft to the output shaft via the input and output friction plates; and a plunger disposed co-axially with and axially moveable relative to the output shaft, wherein axial displacement of the plunger relative to the output shaft causes the biasing force to vary; the method comprising the steps of:
reeling in or reeling out a cable attached to a winch drum;
communicating variation in an effective drum radius caused by the reeling in or reeling out of the cable to generate the axial displacement of the plunger; and
communicating the axial displacement of the plunger to the biasing member to vary the biasing force.

15. The method of claim 14, wherein the step of communicating variation in the effective drum radius comprises, detecting said variation via radial displacement of a pivoted arm in operative communication with an outer surface of an outermost layer of a cable laid on the drum.

16. The method of claim 15, wherein the step of communicating variation in the effective drum radius to the plunger further comprises providing at least one of a mechanical or hydraulic connection from the arm to the plunger, wherein the connection translates the radial displacement of the arm to axial displacement of the plunger.

* * * * *